No. 689,780. Patented Dec. 24, 1901.
E. R. BESEMFELDER.
METHOD OF MAKING AMMONIA FROM WASTE PRODUCTS.
(Application filed Sept. 29, 1899.)
(No Model.)
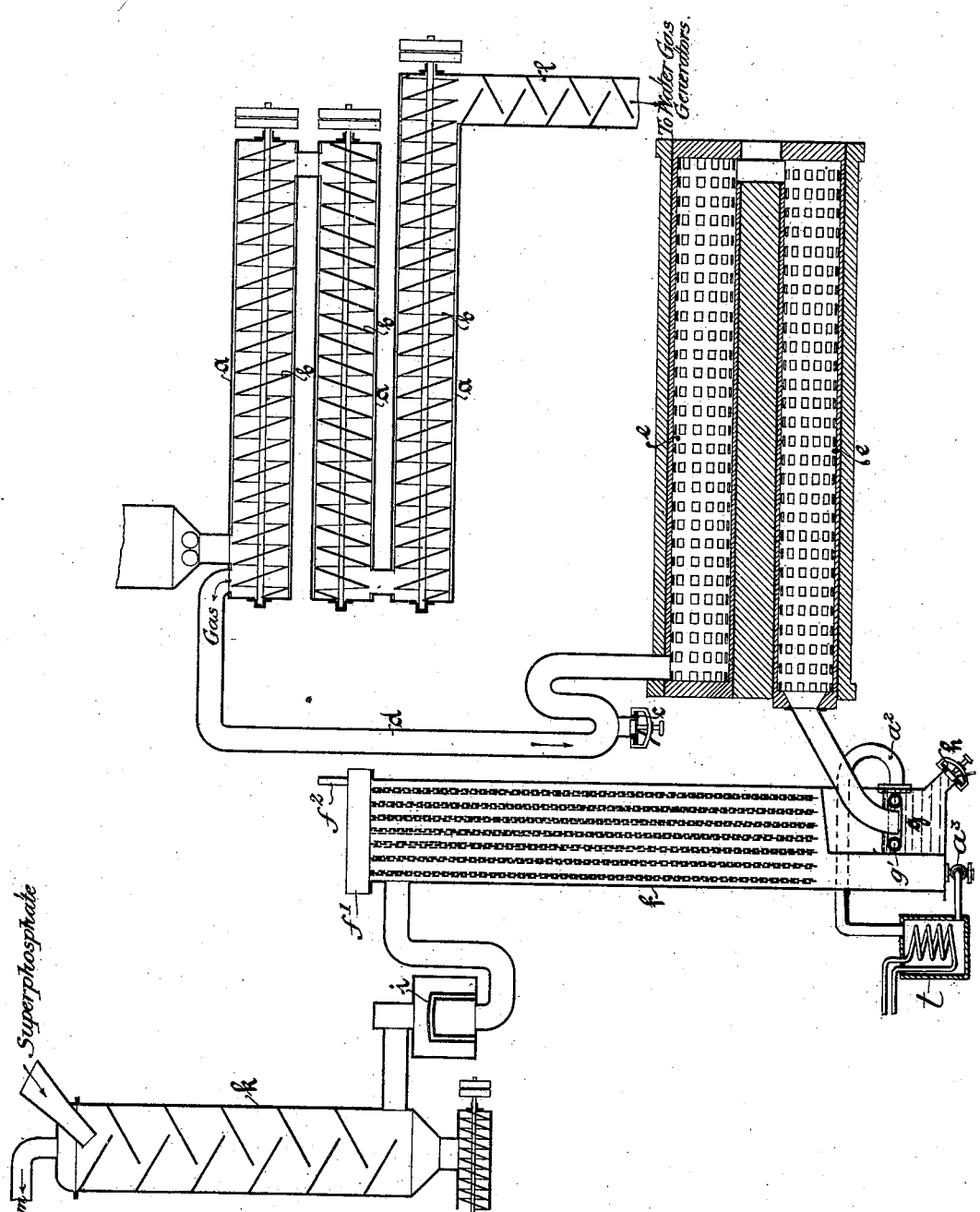
WITNESSES:
J. H. Niles
M. H. Wurthful
INVENTOR
Edward R. Besemfelder
BY
ATTORNEYS.

UNITED STATES PATENT OFFICE.

EDUARD R. BESEMFELDER, OF CHARLOTTENBURG, GERMANY.

METHOD OF MAKING AMMONIA FROM WASTE PRODUCTS.

SPECIFICATION forming part of Letters Patent No. 689,780, dated December 24, 1901.

Application filed September 29, 1899. Serial No. 732,079. (No specimens.)

*To all whom it may concern:*

Be it known that I, EDUARD R. BESEMFELDER, a citizen of the Empire of Germany, residing at Charlottenburg, Germany, have invented certain new and useful Improvements in Processes of Treating Nitrogenous Waste Products, of which the following is a specification.

This invention relates to an improved process of treating nitrogenous waste products obtained in the arts, and in particular from the waste lyes of beet-sugar factories; and the object of the invention is to provide a process for the economical utilization of these wastes.

The invention consists of a process for this purpose comprising the following steps: first, subjecting the waste product to dry distillation; second, conducting the gases thereby obtained in contact with a heated aluminate; third, removing from the resulting gas mixture carbonic acid by conducting the gas mixture in contact with an alkaline lye, and, fourth, removing the ammonia from the gas mixture by conducting the same in contact with calcium diphosphate.

The invention consists, further, in a process comprising these steps, with the qualification, however, that the waste product is subjected in contact with alumina to the dry distillation; and the invention consists, lastly, in such a process wherein also the material is subjected after the distillation to a water-gas process, as hereinafter described, and the slag thus obtained employed as the aluminate in the second step above recited.

The process may be carried out in any suitable apparatus. The accompanying drawing illustrates the essential features of such an apparatus.

In carrying out the process—for example, with the waste liquors from the strontium desaccharification process of beet-sugar factories, as described, for instance, in Stammer's *Lehrbuch der Zuckerfabrikation,* Braunschweig, Vieweg & Sohn, Vol. 2 (second edition)—the waste lye is first concentrated in any suitable apparatus to about 80° Brix and then mixed with about an equal quantity of calcined alumina, such as bauxite, $Al_2O_4(OH)_2$, and coke, and this mixture is then subjected to dry distillation. As equivalents for bauxite in this step of the process may be mentioned $Al_2(OH)_6$ and $Al_2O_3$ and the intermediate compounds. It has been found by practical experience that for carrying on this dry distillation a retort composed of a number of superposed flues $a$, preferably connected at alternate ends, as shown, gives good results. The waste liquor and alumina mixture are supplied through a hopper $a'$ into the uppermost flue and moved slowly and continuously through the flues by means of screw conveyers $b$, rotated by any suitable means. The gases liberated from the heated mass pass back through the flues in a counter-current to the material as the latter is moved forward by the conveyers. As a temperature of only 600° to 700° centigrade is required for obtaining a nearly theoretical yield of ammonia and amin bases, the flues can be made of iron instead of fire-clay, whereby a better and quicker transmission of heat is obtained and all loss of gas prevented. The retort may be heated at the outside by the hot gases from the water-gas generators, as hereinafter mentioned, or from any other source of heat. The gases liberated from the moving mass leave the uppermost flue at a temperature of about 200° centigrade and are conducted through a tube $d$, preferably provided with a covering of a suitable non-conductor of heat, said tube having a siphon-bend, in the lower arm of which is located a trap $c$, in which tar contained in the gas collects and from which it may be readily drawn off. The tube $d$ is connected at its lower end with the decomposition-retort $e$, which may be located below the evaporating-retort $a$ and which is preferably formed also of alternately-connected iron flues. In the drawing a retort having two such flues is shown. The flues of this retort $e$ are charged with earth alkali oxids or aluminates—such, for instance, as slag obtained from the water-gas generators hereinafter referred to. The earth alkali oxid or aluminate may be mixed for the purpose of producing a very large decomposition-surface with broken fire-clay, and the mass is heated in the retort to a temperature of 600° to 700°, so that the gas issuing from the pipe $d$ and passing through the mass is decomposed, and the amin bases in the same, which contain about thirty per cent. of the basic nitrogen in the gas, are almost quantitatively converted into ammonia and gaseous hydrocarbons, which latter can be utilized for enriching the gases used for heating purposes in the process. The gas mixture is conducted by means of a suitable pipe from the decomposition-retort $e$ into a purifying-tower $f$. In this tower it passes first through a seal-chamber $g$, which is provided with a trap $h$ for drawing off the tar which collects therein. The thin brown alkaline waste lye which is continually supplied from the tower to the seal-chamber $g$ is conducted from the same into a suitable vessel $t$ by pipe $a^3$ and subjected to boiling in the same. The resulting ammonia vapors are conducted through pipe $a^2$ and heating-coil $g'$, located above the level of the tar in the seal-chamber $g$, into the tower $f$. The liquor in the chamber $g$ is thereby kept at a temperature above 75° centigrade, and the deposition of crystallized ammonia salts upon the submerged end of the supply-pipe is prevented. In the tower the gases are conducted after they pass the hydraulic seal-chamber in opposite direction to the downwardly-dripping cold brown alkaline waste lye, which runs down on chains that are suspended in the tower. This lye has preferably added to it a suitable quantity of caustic potash. It may be supplied to the reservoir $f'$ at the top of the tower through pipe $f^2$ by means of any suitable pump. The purifying-tower serves thereby at the same time as a cooler and separating-column and enables the downwardly-dripping lye to extract from the rising gases, which according to tests made contain about thirty per cent. of carbonic acid, about half of this carbonic acid, together with organic poisonous compounds—such as $(CN)_2$, $CNH$, or $CN.NH_4$—and sulfocyanid compounds, so that the natural heat value of the gas mixture is increased. Simultaneously a utilization of the heat contained in the gases from the decomposition-retort and in the vapors of the lye-boiling vessels and of the heat of the reactions between the carbonic acid and alkali oxid is effected. When caustic potash has been added to the cold lye, the potash later on is regained by concentrating the lye for dry distillation, the greater part of the strontium which is insoluble in alkaline solution being precipitated as hydrate and utilized again in the strontium desaccharification process, so that as compared with processes heretofore used losses of strontium are minimized and a considerable saving effected. After the gas mixture has passed through the purifying-tower $f$ it is conducted through a separating apparatus $i$, in which the remaining traces of tar and liquor carried along are separated and retained. This apparatus can be the Pelouze apparatus described, for example, in Muspratt's *Chemie in Anwendung auf Künste und Gewerbe*, Braunschweig, Vieweg & Sohn, Vol. 5, (fourth edition,) pages 444, 445, and 446. The gases are then conducted into a superphosphate-absorber $k$ for separating the ammonia contained in the gases. This absorber is constructed in the nature of a tower, with inclined shelves arranged at opposite sides on which the superphosphate flows down by gravity in a counter-current to the gases entering at the lower part of the tower, so that the superphosphate is saturated thereby with ammonia. This superphosphate is that ordinarily employed and known in the fertilizer industry under this name and consists, essentially, of calcium diphosphate, $CaH_4(PO_4)_2$. It contains from seventeen to eighteen per cent. of phosphoric acid, which is soluble in water and absorbs the ammonia from the gas with avidity. The gas leaving the tower $k$ may be conducted directly into a storage-drum of the construction usually employed in gas-works; but it is preferable to conduct it first through another tower of similar construction to the tower $k$, on the shelves of which sulfuric acid, water, or other purifying agent may be placed, so as to absorb any remaining traces of ammonia and prevent any loss of the same. The gas may also before being passed into the storage-drum be conducted into an aluminate solution obtained at a later stage of the process, so that any remaining carbonic acid is entirely removed.

The ammonia-containing superphosphate from the absorber $k$ is free from sulfocyanid and cyanid compounds, in which respect it differs, essentially, from the ammonia phosphate obtained in the purification of coal-gas. It can be used directly for fertilizing purposes, whereas the superphosphate obtained in the manufacture of coal-gas has to be refined to drive off the cyanid and sulfocyanid compounds in order to render it suitable for use as fertilizer.

The heated material delivered from the distillation-retort $a$, which contains for every one hundred parts of concentrated waste lye about twenty-five per cent. of carbon, is then subjected to the water-gas process by conducting it through the tower $l$ and suitable water-gas generators—such, for instance, as shown in United States Patent No. 666,257, granted to me January 22, 1901. In this tower the remaining portion of nitrogen contained in the material and which is about three per cent. of the entire quantity of nitrogen originally contained therein is converted to a great extent into ammonia. The water-gas generators referred to are charged by any suitable means with coke, with which is mixed the hot material discharged from the retorts $a$ through the tower $l$. The operation of the generators consists in "blowing" the same, or, in other words, forcing a blast of air through the contents in the well-known manner in the manufacture of water-gas, and then when the mass has been raised to a glowing heat forcing a blast of superheated steam through the glowing mass, whereby water-gas is produced. The coke serves for supplying the carbon necessary for carrying on the operation. The alternate blasts of air and steam forced through the mass in the generators have the effect of binding the excess of alkali to the alumina, so as to convert the same in the generators into aluminate, and forces all the nitrogen from the lye in the form of ammonia. Furthermore, by this operation the reduced oxygen salts of the lye are converted into carbonates according to the formulæ:

$$K_2S + CO_2 + H_2O = K_2CO_3 + H_2S.$$
$$K_2CO_3 + H_2O = K_2O + CO + O_2 + H_2.$$
$$O_2 + xC = 2CO + (x-2)C.$$

By this conversion the subsequent formation of the aluminates is accelerated and facilitated. The tar obtained in the process is also preferably conducted into the tower, so as to be evaporated in the same. The water-gas formed in the generators is conducted from the same through the tower referred to, connecting the lower retort with the generators, into the retorts and passes in the same in a counter-current to the mass therein, so as to produce by its high temperature the heating up of the retorts at the interior and the distillation of the material therein. At the outside the retorts may be heated by the gases passing off from the water-gas generators and by the products of combustion obtained from the gases by which the decomposition-retort $e$ is heated. These gases may be conducted in flues into suitable jackets placed around the retorts. The glowing residue which leaves the water-gas generators and which is free of carbon drops directly into drums in which a solution of 48° Brix is made of it, which is separated in any suitable filtering apparatus from the earth alkali aluminate or $Al_2O_3$. The latter is calcined and then again mixed with concentrated waste lye. The greenish-colored aluminate solution is rendered colorless by forcing air through the same, ferrous sulfid being precipitated, the aluminate being subsequently decomposed at low temperature by carbonic acid and the alumina precipitated. The carbonic acid which is used for this purpose is preferably that which is separated from the vapors generated during the process after the same have passed the superphosphate-absorber, as before described. The aluminate forms after washing a valuable by-product. The potash solution is evaporated and yields a valuble potassium carbonate. A part of this is preferably changed into caustic potash by means of lime, this potash being added to the hot brown lye flowing into the crystallizing vessels, whereby, as described, the precipitation of the strontium oxid contained in the lye as hydrated oxid is accomplished. The lye from the precipitated hydrate passes into the purifying-tower, as described above. The slag from the water-gas generators, consisting usually of a melted mixture of aluminate and alumina in excess, and porous, like pumice-stone, is used in charging the decomposition-retort $e$, as above described.

In carrying out my improved process the entire quantity of nitrogen contained in the nitrogenous waste is obtained as ammonia in a form suitable for fertilizing purposes, while the carbonaceous part of the waste liquors is obtained in the form of combustible gases, and the potassium contained in the liquor in the form of a refined potash, with simultaneous reclamation of refined alumina as a by-product. As regards the waste liquors of the beet-sugar factory the process is especially adapted for the waste lyes obtained from the mills after the saccharine matter has been extracted from them by the strontium desaccharification process.

The alumina with which the waste lye is mixed for dry distillation possesses the property of giving off water chemically combined therewith only at a high temperature. This property is valuable in the process described, as it obviates the necessity of forcing steam into the distillation-retorts. The excess of alumina prevents the melting together of the aluminates in the water-gas generator. The falling and broken stream of superphosphate absorbs the ammonia very rapidly and uniformly and permits the continuous carrying on of the process. The superphosphate produced is a superior fertilizer, because it contains no cyanid or sulfocyanid or other poisonous or deleterious compounds, these having been removed by the cold alkaline lye dripping down over the chains in the tower. In addition to the production of fuel-gas and a high-grade superphosphate fertilizer refined alumina is obtained as a by-product.

Having thus described my invention, I claim as new and desire to secure by Letters Patent—

1. The process herein described of treating nitrogenous waste products, which consists in subjecting the same to dry distillation, conducting the gas thereby obtained in contact with a heated aluminate, then conducting said gas in contact with an alkaline lye capable of absorbing cyanid compounds, and then passing said gas in contact with calcium diphosphate, substantially as set forth.

2. The process herein described of treating nitrogenous waste products, which consists in subjecting the same in contact with alumina to dry distillation, conducting the gas thereby obtained in contact with a heated aluminate, then conducting said gas in contact with an alkaline lye capable of absorbing cyanid compounds, and then passing said gas in a counter-current to and in contact with a stream of calcium diphosphate, substantially as set forth.

3. The process herein described of treating nitrogenous waste products, which consists in subjecting the same in contact with alumina to dry distillation, mixing coke with the material, subjecting the mixture in a glowing state alternately to blasts of air and steam, conducting the water-gas obtained thereby in contact with a quantity of the waste product and alumina undergoing distillation, and then successively conducting said gas in contact with a heated aluminate, an alkaline lye and an absorbent of ammonia, substantially as set forth.

4. The process herein described of treating nitrogenous waste products, which consists in subjecting the waste product in contact with alumina to dry distillation, mixing coke with the material, subjecting the mixture in a glowing state alternately to blasts of air and steam, conducting the water-gas thereby obtained in contact with a quantity of the waste product and alumina undergoing distillation, then successively conducting said gas in contact with a heated aluminate, an alkaline lye capable of absorbing cyanid compounds and carbonic acid, and calcium diphosphate, substantially as set forth.

5. The process herein described of treating nitrogenous waste products, which consists in subjecting the waste product in contact with alumina to dry distillation, mixing coke with the material, subjecting the mixture in a glowing state alternately to blasts of air and steam, conducting the water-gas thereby obtained in contact with a quantity of the waste product and alumina undergoing distillation, then successively conducting said gas in contact with a heated aluminate, an alkaline lye capable of absorbing cyanid compounds and carbonic acid, and calcium diphosphate, leaching the residue obtained from the alternate air and steam blowing, and precipitating the alumina of the same by means of carbonic acid, substantially as set forth.

In testimony that I claim the foregoing as my invention I have signed my name in presence of two subscribing witnesses.

EDUARD R. BESEMFELDER.

Witnesses:
FRANZ SCHWEGTERLEY,
LUDWIG WENGHÖFFER.